United States Patent
Rorvick et al.

(10) Patent No.: US 7,684,171 B2
(45) Date of Patent: Mar. 23, 2010

(54) CAPACITORS BASED ON VALVE METAL ALLOYS FOR USE IN MEDICAL DEVICES

(75) Inventors: Anthony W. Rorvick, Champlin, MN (US); Joachim Hossick-Schott, Minneapolis, MN (US); John D. Norton, New Brighton, MN (US)

(73) Assignee: Medtronic, Inc., Minneapolis, MN (US)

( * ) Notice: Subject to any disclaimer, the term of this patent is extended or adjusted under 35 U.S.C. 154(b) by 663 days.

(21) Appl. No.: 11/343,356

(22) Filed: Jan. 31, 2006

(65) Prior Publication Data

US 2006/0139850 A1 Jun. 29, 2006

Related U.S. Application Data

(63) Continuation-in-part of application No. 10/692,649, filed on Oct. 23, 2003, now Pat. No. 7,342,774.

(51) Int. Cl.
*H01G 9/04* (2006.01)
(52) U.S. Cl. .................. 361/528; 361/508; 361/509; 361/523; 361/525; 361/529
(58) Field of Classification Search ......... 361/508–512, 361/503–504, 523–540, 516–519
See application file for complete search history.

(56) References Cited

U.S. PATENT DOCUMENTS

| | | | |
|---|---|---|---|
| 4,633,373 A | 12/1986 | Phillips | |
| 5,131,388 A * | 7/1992 | Pless et al. ............. | 607/5 |
| 5,646,815 A | 7/1997 | Owens | |
| 6,006,133 A | 12/1999 | Lessar et al. | |
| 6,040,975 A * | 3/2000 | Mimura ............... | 361/523 |
| 6,141,205 A | 10/2000 | Nutzman et al. | |
| 6,231,993 B1 * | 5/2001 | Stephenson et al. ...... | 428/472.1 |
| 6,239,965 B1 | 5/2001 | Shiraishi et al. | |
| 6,304,427 B1 | 10/2001 | Reed et al. | |
| 6,325,831 B1 | 12/2001 | Chiavarotti et al. | |
| 6,421,227 B2 * | 7/2002 | Nitoh et al. ............ | 361/523 |
| 6,430,033 B1 * | 8/2002 | Mitsui et al. ........... | 361/525 |
| 6,462,934 B2 * | 10/2002 | Kimmel et al. ......... | 361/508 |
| 6,560,089 B2 | 5/2003 | Miltich et al. | |
| 6,795,729 B1 * | 9/2004 | Breyen et al. .......... | 607/5 |
| 6,801,424 B1 * | 10/2004 | Nielsen et al. ......... | 361/517 |
| 6,802,951 B2 | 10/2004 | Hossick-Schott | |
| 6,862,169 B2 | 3/2005 | Kuroyanagi | |
| 6,867,088 B2 | 3/2005 | Sakai et al. | |

(Continued)

FOREIGN PATENT DOCUMENTS

EP 0196093 A1 10/1986

OTHER PUBLICATIONS

Power Geometry and Structural Design of the High Volumetric Efficiency Tantalum Electrolytic Capacitor-IEEE Transactions on Parts, Hybrids, and Packaging, vol. PHP-9, No. 3, Sep. 1793-Stephen E. Hluchan.

(Continued)

*Primary Examiner*—Nguyen T Ha

(57) ABSTRACT

A capacitor cell for use in medical devices, comprising: an anode substrate; a dielectric layer, formed on the anode substrate, including at least two valve metal oxides; a cathode separated from the anode substrate; and an electrolyte operatively associated with the anode substrate and the cathode.

29 Claims, 11 Drawing Sheets

U.S. PATENT DOCUMENTS

| | | | |
|---|---|---|---|
| 6,967,828 B2 * | 11/2005 | Miltich et al. | 361/508 |
| 6,995,971 B2 * | 2/2006 | Norton et al. | 361/523 |
| 2003/0088273 A1 | 5/2003 | Liu et al. | |
| 2004/0016978 A1 | 1/2004 | Yano et al. | |
| 2004/0134874 A1 | 7/2004 | Hossick-Schott et al. | |
| 2004/0225327 A1 | 11/2004 | Norton et al. | |
| 2004/0240149 A1 | 12/2004 | Lessner et al. | |
| 2004/0243183 A1 | 12/2004 | Norton et al. | |

OTHER PUBLICATIONS

Approaching the Limits: The Latest Developments in Solid Tantalum Capacitors-Electronic Engineering Oct. 1991-Bill Millman.

Carts '98 Program-Lowest ESR Tantalum Chip Capacitor, Eric K. Reed, Jim C. Marshall, John D. Prymak.

Carts-Europe '98-Lowest ESR Tantalum Chip Capacitor, Eric K. Reed, Jim C. Marshall, John D. Prymak.

Carts '99-18 Milliohms and Falling-New Ultra-Low ESR Tantalum Chip Capacitors, Eric K. Reed, Jim C. Marshall.

Carts-Europe '99-Lowest Available ESR Conformally-Coated Multiple-Anode Tantalum Capacitor- Jeremy Ladd, Vishay Sprague.

Carts-Europe 2001-Improved ESR on $MnO_2$ Tantalum Capacitors at Wide Voltage Range-I. Horacek, T. Zednicek, M. Komarek, J. Tomaso, S. Zednicek, W. A. Millman, J. Sikula, J. Hlavka.

Carts 2002-Lowest ESR Tantalum Capacitors With High CV Values- H. Zillgen, V. Döge, W. Braunwarth.

* cited by examiner

CAPACITORS BASED ON VALVE METAL ALLOYS FOR USE IN MEDICAL DEVICES

RELATED APPLICATION

This application is a continuation-in-part of U.S. patent application Ser. No. 10/692,649, filed Oct. 23, 2003, entitled "Advance valve metal anodes with complex interior and surface features and methods for processing same."

TECHNICAL FIELD

The invention relates generally to electrochemical cells and in particular to capacitor cell chemistries including valve metal alloys for use in medical devices.

BACKGROUND

Implantable medical devices are used to treat patients suffering from a variety of conditions. Examples of implantable medical devices include implantable pacemakers and implantable cardioverter-defibrillators (ICDs), which are electronic medical devices that monitor the electrical activity of the heart and provide electrical stimulation to one or more of the heart chambers as necessary. Pacemakers deliver relatively low-voltage pacing pulses in one or more heart chambers. ICDs can deliver high-voltage cardioversion and defibrillation shocks in addition to low-voltage pacing pulses Pacemakers and ICDs generally include pulse generating circuitry required for delivering pacing and/or cardioversion and defibrillation pulses, control circuitry, telemetry circuitry, and other circuitry that require an energy source, e.g. at least one battery. In addition to a battery, ICDs include at least one high-voltage capacitor for use in generating high-voltage cardioversion and defibrillation pulses. Implantable medical devices (IMDs), including pacemakers, ICDs, drug pumps, neurostimulators, physiological monitors such as hemodynamic monitors or ECG monitors, typically require at least one battery to power the various components and circuitry used for performing the device functions.

IMDs are preferably designed with a minimal size and mass to minimize patient discomfort and prevent tissue erosion at the implant site. Batteries and capacitors, referred to collectively herein as "electrochemical cells," contribute substantially to the overall size and mass of an IMD. Electrochemical cells used in IMDs are provided with a hermetically-sealed encasement for housing an electrode assembly, including an anode and cathode separated by a separator material, an electrolyte, and other components such as electrode connector feed-throughs and lead wires. The encasement includes a case and a cover that are sealed after assembling the cell components within the case.

The total amount of the anode and cathode material required in the cell will depend on the energy density, volume, voltage, current, energy output, and other requirements of the cell for a particular application. Anode and cathode material, with an intervening separator, may be arranged in a coiled electrode assembly. Both round and flat cylindrical coiled electrode assemblies are known in the art. Flat electrochemical cell designs tend to improve the volumetric efficiency of the cell because they are generally better suited for fitting within an IMD housing with other device components. Flat electrochemical cell designs may utilize a stacked electrode assembly wherein anode, cathode and intervening separator material are arranged in a stacked configuration.

The implementation and use of high voltage output systems within ICDs is well known. Generally, ICDs have high voltage (HV) output capacitors, typically valve metal electrolytic capacitors, which are typically charged to a substantially full (or maximum) preprogrammed charge via high current battery systems, such as lithium/silver vanadium oxide (SVO) battery cells, coupled to DC-to-DC voltage converters in order to generate cardioversion/defibrillation (C/D) shocks. The HV output capacitors are charged up to the programmed voltage when tachyarrhythmia detection criteria are met and a C/D shock is to be delivered by discharging the HV output capacitors through the heart between C/D electrodes.

The term "valve metal" stands for a group of metals including aluminum, tantalum, niobium, titanium, zirconium, etc., all of which form adherent, electrically insulating, metal oxide dielectric films or layers upon anodic polarization in electrically conductive solutions. Valve metal electrolytic capacitors have a relatively high energy density per unit volume making them volumetrically efficient in terms of the energy available.

The performance of valve metal and other types of capacitors depends upon several factors (e.g., the effective surface area of the anodes and cathodes that can be contacted by electrolyte, the dielectric constant of the oxide formed on the anode surface, the thickness of the dielectric layer, the conductivity of the electrolyte, etc.). The thickness of the dielectric layer is determined by the anodization method used and the anode substrate material.

Wet electrolytic capacitors essentially consist of an anode electrode, a cathode electrode, a barrier or separator layer for separating the anode and cathode, and a liquid electrolyte. In cylindrical electrolytic capacitors, the anode electrode is typically composed of wound anodized aluminum foil in which subsequent windings are separated by at least one separator layer. The anodes in a flat electrolytic capacitor (FEC) may consist of stacked sheets of aluminum that are electrically connected together. In a slug or pellet type of capacitor a valve metal powder is pressed, sintered and formed into a typically unitary anode electrode, and the anode is separated from at least one cathode by a electrically insulative separator layer as is known in the art and as described further below. For an FEC, typically a plurality of aluminum sheets are etched or perforated to increase surface area. For both FEC- and pressed and sintered-type capacitors, an oxide dielectric is formed upon exposed surfaces of the anode (the pressed and sintered structure or etched or the perforated sheets) when the anode is immersed in a formation electrolyte while electrical current circulates therethrough during manufacture. Examples of electrolytic capacitors are disclosed, for example in commonly assigned U.S. Pat. No. 6,006,133.

As it is desirable to minimize overall IMD size and mass, electrochemical cell designs that allow cell size and mass to be reduced are desirable. Reduction of capacitor cell size and/or mass, without reducing the available energy, may allow balanced addition of volume to other IMD components, thereby increasing device longevity and/or increasing device functionality.

DETAILED DESCRIPTION

In the following description, references are made to illustrative embodiments for carrying out the invention. It is understood that other embodiments may be utilized without departing from the scope of the invention.

Figure 1:
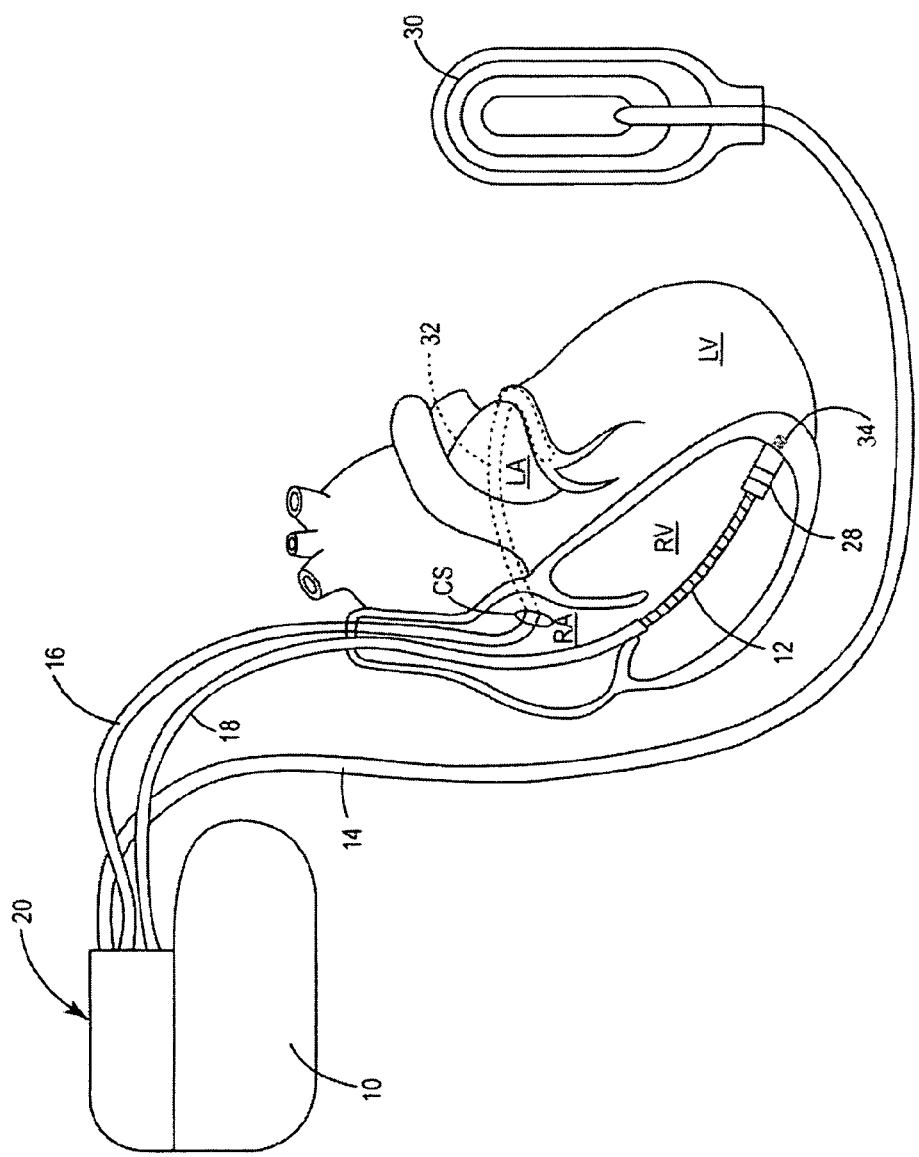
FIG. 1 illustrates one example of an implantable medical device according to one embodiment of the invention.

FIG. 1 illustrates one example of an implantable medical device according to one embodiment of the invention. IMD 10 is embodied as an ICD and is shown with associated electrical leads 14, 16 and 18 and their operative relationship to a human heart. The leads are coupled to IMD 10 by means of multi-port connector block 20, which contains separate connector ports for each of the three leads illustrated. Lead 14 is coupled to subcutaneous electrode 30, which is intended to be mounted subcutaneously in the region of the left chest. Lead 16 is a coronary sinus lead employing an elongated coil electrode 32 which is located in the coronary sinus and/or great cardiac vein region of the heart. The location of the coronary sinus electrode 32 may be anywhere along the heart from a point within the opening of the coronary sinus (CS) to a point in the vicinity of the left atrial (LA) appendage or left ventricle (LV).

Lead 18 is provided with elongated coil electrode 12 which is disposed in the right ventricle (RV) of the heart. Lead 18 also includes a tip electrode 34 and ring electrode 28 available for pacing and sensing in the RV. While one lead system having a particular electrode arrangement is shown in FIG. 1, numerous lead systems with varying electrode configurations are possible and known in the art for use with an ICD or other IMDs used for delivering cardiac stimulation pulses.

In the system illustrated, cardiac pacing pulses can be delivered in the right ventricle (RV) between tip electrode 34 and ring electrode 28. Electrodes 28 and 34 can also be employed to sense electrical signals for detecting the heart rhythm. High-voltage defibrillation or cardioversion pulses may be delivered as needed using any of the right ventricular coil electrode 12, coronary sinus coil electrode 32, and subcutaneous patch electrode 30. In some embodiments, the housing of IMD 10 is used as a "case" or "can" electrode in combination with any of the high-voltage electrodes for delivering defibrillation or cardioversion shocks.

Figure 2:
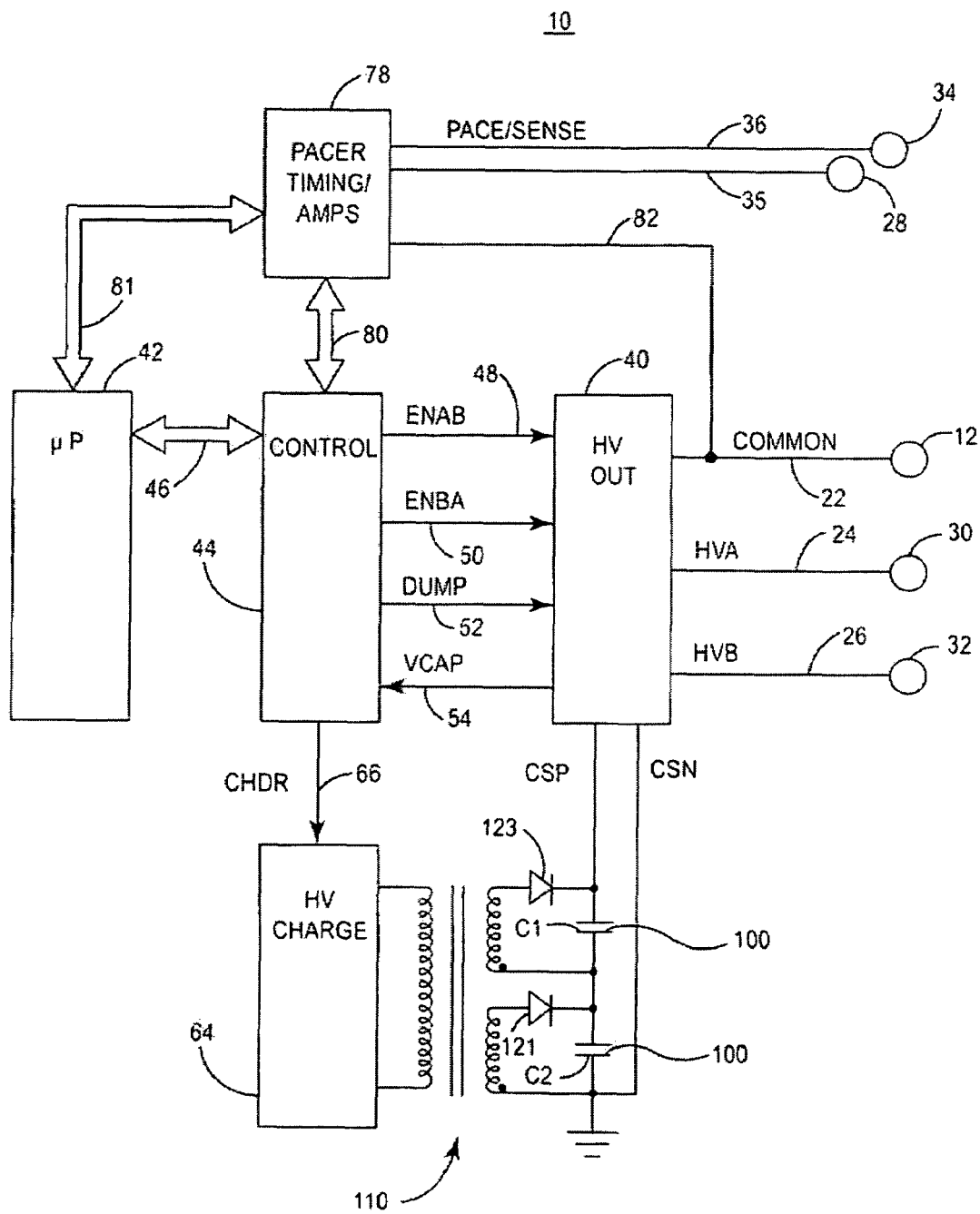
FIG. 2 is a functional block diagram of one embodiment of the IMD shown in FIG. 1.

FIG. 2 is a functional block diagram of one embodiment of IMD 10 shown in FIG. 1, illustrating the interconnection of high voltage output circuit 40, high voltage charging circuit 64 and capacitors 100. IMD 10 includes a control system typically in the form of a microprocessor 42, which performs all necessary computational functions within the device. Microprocessor 42 is linked to control circuitry 44 by means of bidirectional data/control bus 46, and thereby controls operation of the high voltage output circuitry 40 and the high voltage charging circuitry 64. On reprogramming of the device or on the occurrence of signals indicative of delivery of cardiac pacing pulses or of the occurrence of cardiac contractions, pace/sense circuitry 78 will awaken microprocessor 42 to perform any necessary mathematical calculations, to perform tachycardia and fibrillation detection procedures and to update the time intervals controlled by the timers in pace/sense circuitry 78.

The basic operation of such a system in the context of an ICD may correspond to any system known in the art. Control circuitry 44 provides signals to high voltage output circuitry 40. Those signals include control signals, labeled here as ENAB line 48, ENBA line 50, and DUMP line 52 which initiates discharge of the output capacitors 100. VCAP line 54 provides a signal indicative of the voltage stored on the output capacitors 100 to control circuitry 44. High voltage electrodes 12, 30 and 32 illustrated in FIG. 1, above, are shown coupled to output circuitry 40 by means of conductors 22, 24 and 26. For ease of understanding, those conductors are also labeled as "COMMON", "HVA" and "HVB". However, other configurations are also possible. For example, subcutaneous electrode 30 may be coupled to HVB conductor 26, to allow for a single pulse regimen to be delivered between electrodes 12 and 30. During a logic signal on ENAB line 48, a cardioversion/defibrillation pulse is delivered between electrode 30 and electrode 12. During a logic signal on ENBA line 50, a cardioversion/defibrillation pulse is delivered between electrode 32 and electrode 12.

The output circuitry includes one or more capacitors C1 and C2 100, arranged in a capacitor bank, and diodes 121 and 123, used for delivering high-voltage pulses to the electrodes. In FIG. 2, capacitors 100 are illustrated in conjunction with high voltage charging circuitry 64, controlled by the control/timing circuitry 44 by means of CHDR line 66. As illustrated, capacitors 100 are charged by means of a high frequency, high voltage transformer 110. Proper charging polarities are maintained by means of the diodes 121 and 123. VCAP line 54 provides a signal indicative of the voltage on the capacitor bank, and allows for control of the high voltage charging circuitry and for termination of the charging function when the measured voltage equals the programmed charging level.

Pace/sense circuitry 78 includes a sense amplifier used for sensing R-waves, as is known in the art. Pace/sense circuitry 78 also includes a pulse generator for generating cardiac pacing pulses, which may also correspond to any known cardiac pacemaker output circuitry and includes timing circuitry for defining pacing intervals, refractory intervals and blanking intervals, under control of microprocessor 42 via control/data bus 80.

Control signals triggering generation of cardiac pacing pulses by pace/sense circuitry 78 and signals indicative of the occurrence of R-waves, from pace/sense circuitry 78 are communicated to control circuitry 44 by means of a bi-directional data bus 80. Pace/sense circuitry 78 is coupled to tip electrode 34 and ring electrode 28, illustrated in FIG. 1, by respective conductors 35 and 36. Pace/sense circuitry 78 may also be coupled to right ventricular coil electrode 12 by a conductor 82, allowing for sensing of R-waves between electrodes 34 and 28 and for delivery of pacing pulses between electrodes 34 and 28.

The capacitor cells 100 include an anode, a cathode, an electrolyte operatively associated with the anode and the cathode, and a separator disposed between the anode and cathode. The separator prevents internal electrical short circuit conditions while allowing sufficient movement of the electrolyte within the cell. The capacitor cells 100 provide the charge necessary to HV output circuitry 40 for generating high voltage defibrillation/cardioversion shocks as needed.

Figure 3:
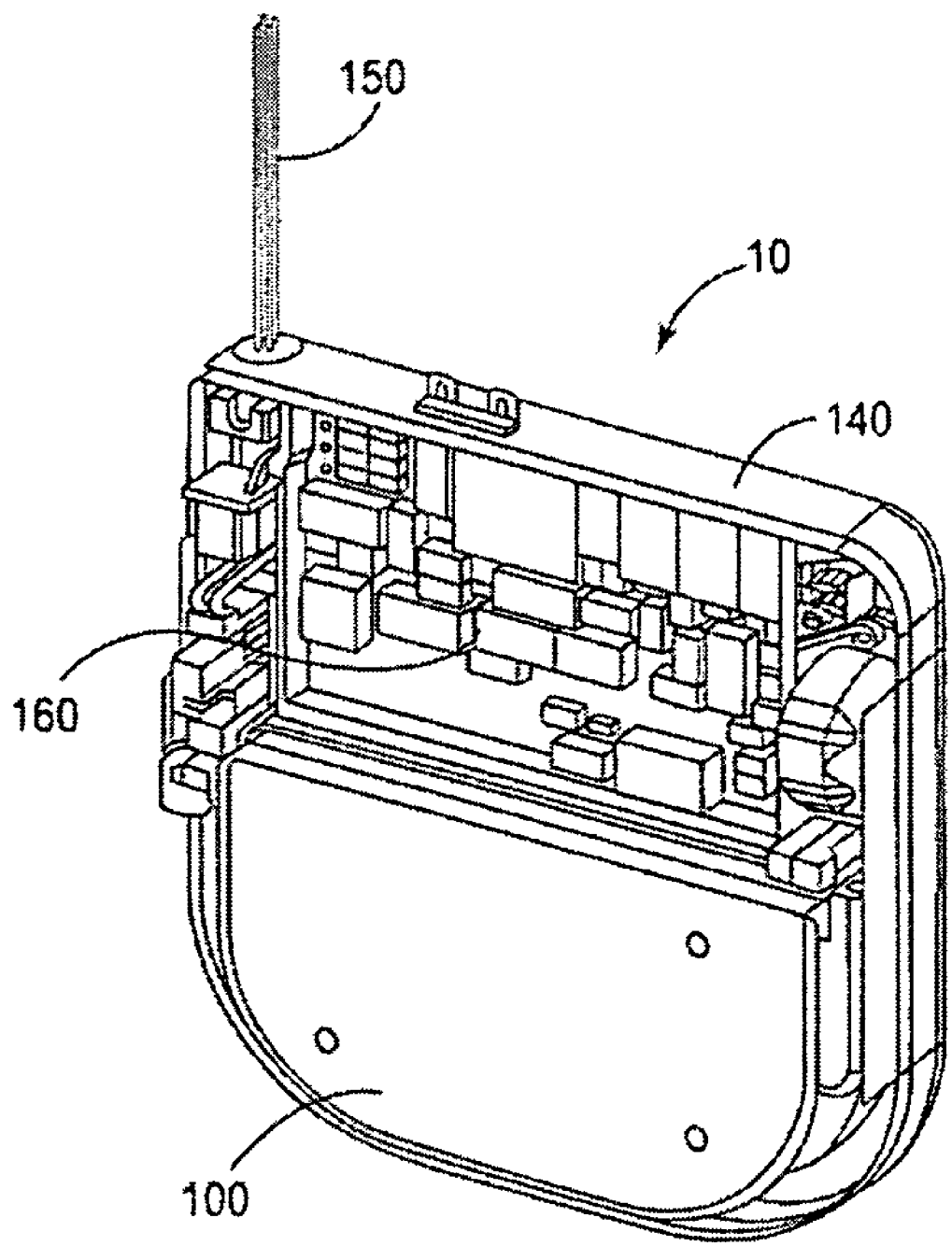
FIG. 3 is a sectional view of a capacitor cell placed within a housing of an IMD.

FIG. 3 is a sectional view of a capacitor cell 100 placed within a housing 140 of IMD 10. Electronic components included in IMD 10, such as those represented in the functional block diagram of FIG. 2, are included in an electronics module 160. Electronics module 160 can assume a wide variety of forms and generally includes a circuit board maintaining and interconnecting electrical components. The exact composition of electrical components can vary from application to application, as is known in the art, but is generally configured to perform various sensing or monitoring routines, as well as to store data related to operation of IMD 10, such as therapy delivery operations. Electronics module 160 is electrically coupled to stimulation and sensing electrodes through feed-through 150, extending through device housing 140.

Capacitor 100 is typically a high-voltage capacitor capable of storing energy using a low-voltage battery as a charge source. At an appropriate time, as controlled by electronics module 160, capacitor 100 is discharged. In the case of an ICD, capacitor 100 is discharged through selected electrodes for delivering a high-voltage cardioversion or defibrillation pulse to a patient's heart. Capacitor 100 may include multiple capacitors connected electrically in series by interconnections in electronics module 160. In different embodiments, IMD 10 may include multiple capacitors arranged in any configuration suitable for containment within IMD 10 and connection to electronics module 160. Multiple capacitors may be provided with identical dimensions to allow stacking for volumetric efficiency. In other embodiments, multiple capacitors may be provided with different sizes and shapes. It is expected that reformation of capacitor 100 may be needed after periods of inactivity to maintain charging efficiency. Capacitor reformation methods are generally described in U.S. Pat. Application No. 2004/0225327 (Norton, et al.).

Figure 4:
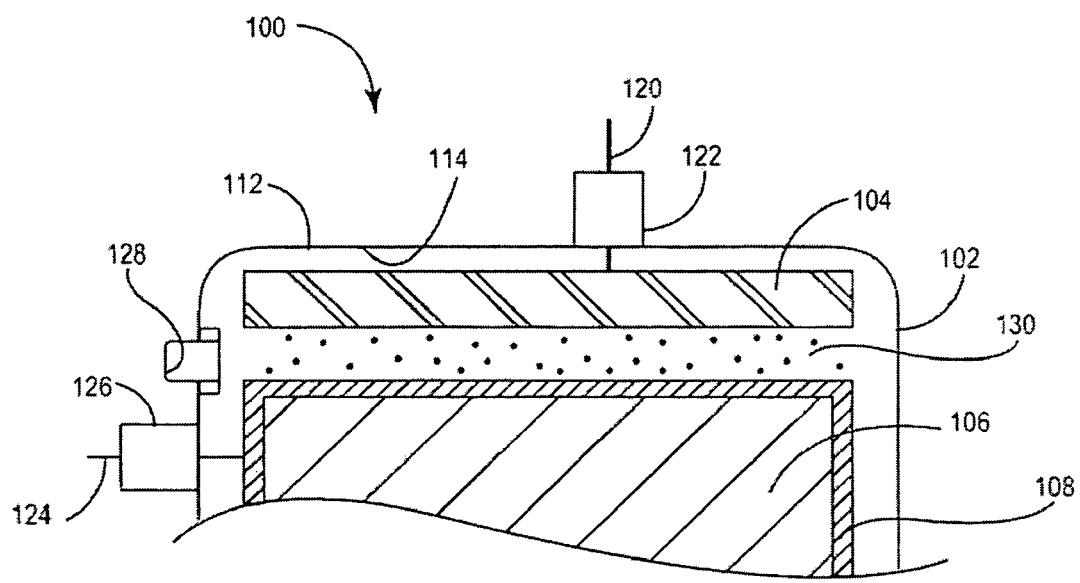
FIG. 4 is a partial, cross-sectional view of a capacitor according to one embodiment of the invention.

FIG. 4 is a partial, cross-sectional view of a capacitor according to one embodiment of the invention. Capacitor 100 includes an encasement 102 for encasing the internal components of the capacitor 100. Encasement 102 is generally constructed from a corrosion resistant material such as titanium or stainless steel. Encasement 102 may be constructed from other materials including other corrosion resistant metals or alloys, polymeric materials and ceramic materials. Encasement 102 is commonly hermetically sealed, particularly when capacitor 100 is used in an IMD. Encasement 102 generally has a prismatic geometry and may include a case with a substantially flat cover. The case may be a shallow-drawn or deep-drawn case, as is known in the art, with the cover typically welded to the case to form a hermetic seal. Examples of encasements used to enclose electrochemical cells for use in implantable medical devices are generally described in U.S. Pat. No. 6,141,205 (Nutzman, et al.). Encasement 102 may alternatively be provided with a "clamshell" design having a two halves that close together to form a sealed encasement. Any encasement configuration known in the art may be used for enclosing the internal components of capacitor 100.

A cathode 104 and anode substrate 106 are disposed within encasement 102. The anode substrate 106 is provided with mixed oxide dielectric layer 108 formed thereon. Anode substrate 106 may be fabricated from any valve metal (aluminum, niobium titanium, tantalum, zirconium, etc.) or valve metal alloy, including multi-phase alloys, provided in any suitable form including foils, powders or grown dendritic structures. For example, anode substrate 106 may be formed as a pellet or slug structure fabricated from a pressed and sintered valve metal or valve metal alloy powder. In one embodiment, anode substrate 106 is formed as a slug structure formed from a tantalum-niobium alloy powder.

The dielectric layer 108 is a mixed dielectric layer including two or more valve metal oxides. When anode substrate 106 is formed from a valve metal alloy, the dielectric layer 108 can be grown on anode substrate 106 electrochemically. Dielectric layer 108 is anodically grown by applying a positive potential to the anode substrate 106 in a formation electrolyte bath. A typical formation electrolyte solution includes ethylene glycol, polyethylene glycol, de-ionized water, and $H_2PO_4$ and has a conductivity anywhere between about 50 micro-Siemens per cm to about 20,000 micro-Siemens per cm at 40 degrees Celsius.

The anode substrate 106 is brought to a target formation potential with a DC electrical current flowing through the anode-electrolyte system. Stainless steel cathodes are commonly used with the glycol-containing formation electrolyte. The dielectric layer 108 is grown to a desired thickness by controlling the applied potential. The thickness of dielectric layer 108 will depend on the particular application and relate to the desired energy density, volume, voltage, current, energy output and other capacitor cell requirements of the particular application.

Capacitor 100 including a mixed valve metal oxide dielectric layer 108 may be provided with an improved energy density because the dielectric constant of mixed dielectric layer 108 is expected to be greater than that of dielectric layers of similar thickness formed from a single valve metal oxide. The mixed valve metal oxide dielectric layer 108 may include a combination of two or more valve metal oxides, including, but not limited to, any combination of tantalum oxide, niobium oxide, aluminum oxide, chromium oxide, zirconium oxide, zinc oxide, vanadium oxide, and/or titanium oxide. For example in one embodiment, anode substrate 106 includes a tantalum-niobium alloy and the dielectric layer 108 includes tantalum oxide and niobium oxide grown anodically on the substrate 106. Methods for anodizing valve metal anodes are generally disclosed in U.S. Pat. Application Pub. No. 2003/0141193 (Hossick-Schott), hereby incorporated herein by reference in its entirety It is recognized that other methods may be used for depositing a mixed valve metal oxide dielectric layer 108 onto anode substrate 106. The method selected will depend in part on the material used to form anode substrate 106. For example, a vapor deposition method may be used when the dielectric layer 108 includes an oxide of a valve metal not included in the anode substrate 106. By using other types of deposition methods, the valve metal oxides included in the dielectric layer 108 are not limited to oxides of valve metal(s) used to form anode substrate 106.

Furthermore, it is recognized that material used to form anode substrate 106 are not limited to valve metals or alloys thereof. Any material having the characteristics desired for a particular application, such as ductility, mass, dielectric constant, and surface area may be used. In alternative embodiments, the dielectric layer 108 may be applied using physical vapor deposition methods, such as reactive sputtering, or other appropriate techniques for depositing the mixed oxide dielectric layer 108 on the anode substrate 106. The deposition method used will depend on the anode substrate material. For example, physical vapor deposition methods generally require a non-porous substrate. Accordingly, anode substrate 106 may be provided as a non-porous ceramic or polymeric material, or as a porous material treated with a non-porous coating prior to depositing dielectric layer 108.

In some embodiments, a ceramic or polymeric anode substrate is formed onto which a conductive material is applied or sputtered. The mixed valve metal oxide dielectric layer 106 may then be formed on the conductive material. Embodiments of the invention, therefore, include ceramic or polymeric anode configurations, including multi-layered configurations, in which a mixed dielectric layer including two or more valve metal oxides are deposited thereon.

The anode substrate 106 is electrically coupled to an anode lead 124 that passes through the inner surface 114 and outer surface 112 of encasement 102 via a feed-through 126. Electrical coupling to anode substrate 106 may be achieved using a variety of methods including, for example, ultrasonic welding, resistance welding, laser welding, cold welding, riveting, or staking. Any method known in the art for electrically coupling an electrode enclosed within a capacitor to a lead wire may be used. The connection method will depend on the particular electrode configuration and number of electrodes, and therefore the number of connection points, used. Examples of electrode connection methods are generally described in U.S. Pat. No. 6,560,089 (Miltich, et al.), hereby incorporated herein by reference in its entirety.

The anode lead 124 is electrically isolated from the encasement 102 by a feed-through 126. In one embodiment, the feed-through 126 is constructed of a glass insulator that seals the anode lead 124 to the encasement 102 while maintaining electrical isolation between anode lead 124 and the encasement 102. Other feed-through designs may include epoxy seals, ceramic seals, O-ring compression seals, riveted compression seals, or any other design known in the art. The feed-through 126, in addition to electrically isolating the anode lead 124 from the encasement 102, substantially prevents material, such as a liquid electrolyte from leaking out of the encasement 102. The feed-through 126 also substantially prevents foreign substances from entering into the encasement 102, thus reducing the likelihood of contamination of the capacitor internal components.

Cathode 104 may be formed from a valve metal (e.g., aluminum, titanium, tantalum, niobium, zirconium, etc.) or a valve metal alloy. The valve metal cathode may be coated with an oxide such as a valve metal oxide, a mixed oxide including two or more valve metals, a nitride, carbon, a carbide, a carbon nitride, or a titanate. Electrochemically active materials including, for example, ruthenium oxide, iridium oxide, vanadium oxide, silver vanadium oxide, and carbon monofluoride are also suitable for fabricating or coating cathode 104.

In some embodiments, cathode 104 is separated (i.e., electrically isolated) from an inner surface 114 of the encasement 102. The cathode 104 is coupled via an electrical connection to a cathode lead 120 that extends through the inner surface 114 and outer surface 112 of the encasement 102. A lead wire may be coupled to cathode 104 using any electrode connection methods known in the art, as described above and in the '089 patent.

The cathode lead 120 is electrically isolated from the encasement 102 by feed-through 122, which may be similar in construction to the anode lead feed-through 126 (as previously discussed). Any feed-through configuration known in the art may be used for enabling electrical coupling to anode substrate 106 and cathode 104.

In other embodiments, the cathode 104 may be physically or electrically connected to encasement 102 such that insulated feedthrough 122 is not required for electrically isolating cathode 104 from encasement 102. Cathode 104 may be formed on an inner surface of encasement 102, and a cathode lead may extend from encasement 102.

The anode substrate 106 and/or cathode 104 may be surface enhanced to increase the available conductive surface area. Methods for enhancing the surface area of anode substrate 106 or cathode 104 include chemical etching and mechanical roughening. Any method known in the art for increasing the conductive surface area of an electrode may be used. For example, anode substrate 106 may be an etched foil formed from a valve metal or valve metal alloy. Alternatively, anode substrate 106 may be a porous sintered slug having a complex surface and interior features such as cavities or through-holes as described in co-pending U.S. Pat. Application Pub. No. 2004/0134874.

The capacitor 100 generally includes an electrolyte 130 disposed between and in contact with the cathode 104 and anode substrate 106 having dielectric layer 108. Electrolyte 130 provides a current path between anode substrate 106 and cathode 104. Capacitor 100 may be a wet electrolytic capacitor wherein encasement 102 is filled using fill port 128 with a fluid electrolyte 130. Fill port 128 may be configured according to any design known in the art. Fill port 128 commonly includes a ferrule and a fill tube through which electrolyte is delivered to the interior of encasement 102. After delivering the electrolyte, a sealing member is typically placed in the fill tube which is then sealed closed using laser welding or another fusion welding technique, though other sealing methods could also be used.

Liquid electrolytes can be based on an inorganic acid, such as sulfuric acid, or on solvents such as ethylene glycol or glycol ethers mixed with organic or inorganic acids or salt. The selection of the particular electrolyte 130 may depend on the reactivity of the electrolyte 130 with the materials used for the anode substrate 106, dielectric layer 108 and cathode 104. For example, a sulfuric acid solution used as the electrolyte may be desirable when the anode substrate 106 includes tantalum and/or niobium. In some embodiments, electrolyte 130 may be provided as a solid electrolyte material, as will be further described below. It is recognized that in some embodiments, such as embodiments including a multi-layered electrode assembly, an electrolyte is not necessary.

The anode substrate 106 is shown in FIG. 4 as a porous sintered slug of anode material arranged in operative association with cathode 104 and electrolyte 130. However, the anode substrate 106, having dielectric layer 108 formed thereon, and the cathode 104 can be configured together within encasement 102 according to any suitable arrangement known in the art, including multiple-anode configurations. Such arrangements may include a separator disposed between the cathode 104 and anode substrate 106 to prevent short-circuit between the electrodes, particularly when a liquid electrolyte is used. Other configurations may use a solid electrolyte, with or without a separator material. Such configurations include coiled, stacked or layered, and slug type configurations.

Separator materials and configurations used may correspond to any known in the art. For example, separator materials may be layered between anode substrate 106 and cathode 104, or wrapped around one or both of anode substrate 106 and cathode 104. Anode substrate 106 and/or cathode 104 may be enveloped within a pouch of substrate material which may be sealed. A separator may be formed from one or more layers of a paper material or impregnated paper material such as kraft paper or manila paper. Separator materials may alternatively be formed from one or more layers of a porous polymeric material, such as polypropylene or PTFE, or fabric gauze material. It is recognized that any known material and configuration for providing a separator between anode substrate 106 and cathode 104 may be used without departing from the scope of the invention.

Figure 5:
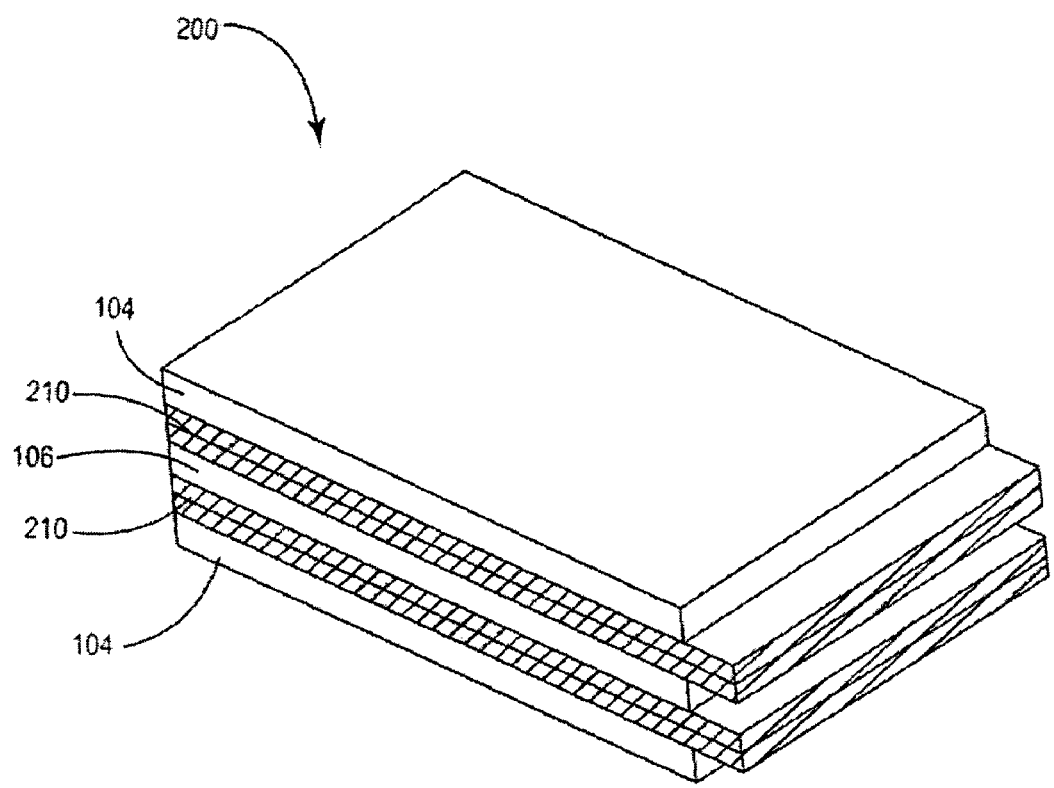
FIG. 5 shows a portion of an electrode subassembly formed from an anode substrate, having a mixed valve metal oxide dielectric layer formed thereon, a separator, and a cathode configured together as a "laminate."

FIG. 5 shows a portion of an electrode subassembly formed from an anode substrate 106, having a mixed valve metal oxide dielectric layer formed thereon, a separator 210, and a cathode 104 configured together as a "laminate." These materials can be adhered together by pressing or using any suitable adhesive, for example by using an ion conducting adhesive. The electrode subassembly 200 can be made by adhering an anode substrate 106 and cathode 104 to each side of the separator 210. FIG. 5 specifically shows an electrode subassembly 100 having an cathode/separator/anode/separator/cathode configuration. However, it should be apparent to one of skill in the art that any number of anode, separator and cathode layers or strips of material can be used to form the electrode subassembly 200.

Figure 6:
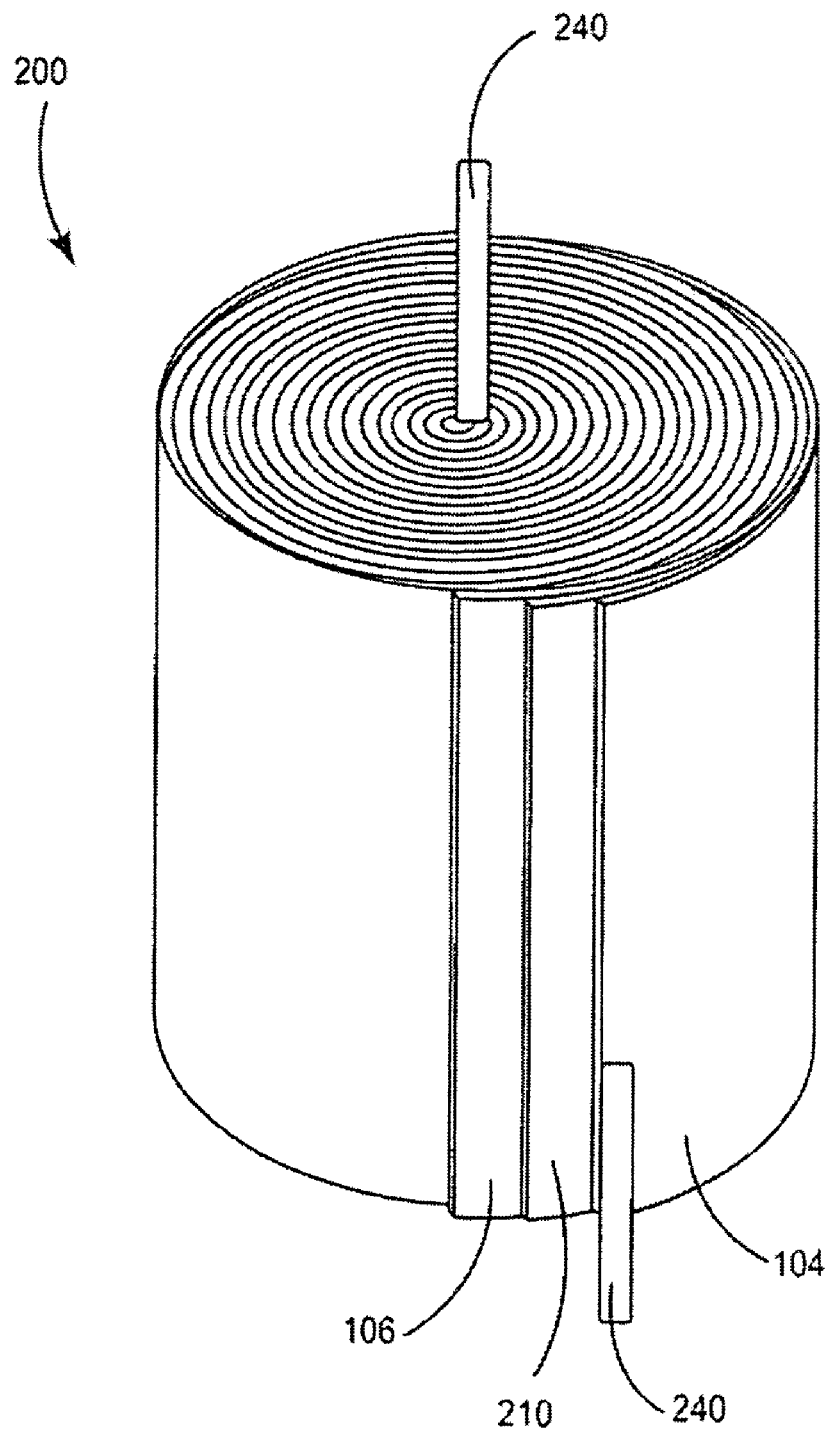
FIG. 6 shows the electrode subassembly of FIG. 5 wrapped in a cylindrical coil configuration.
Figure 7:
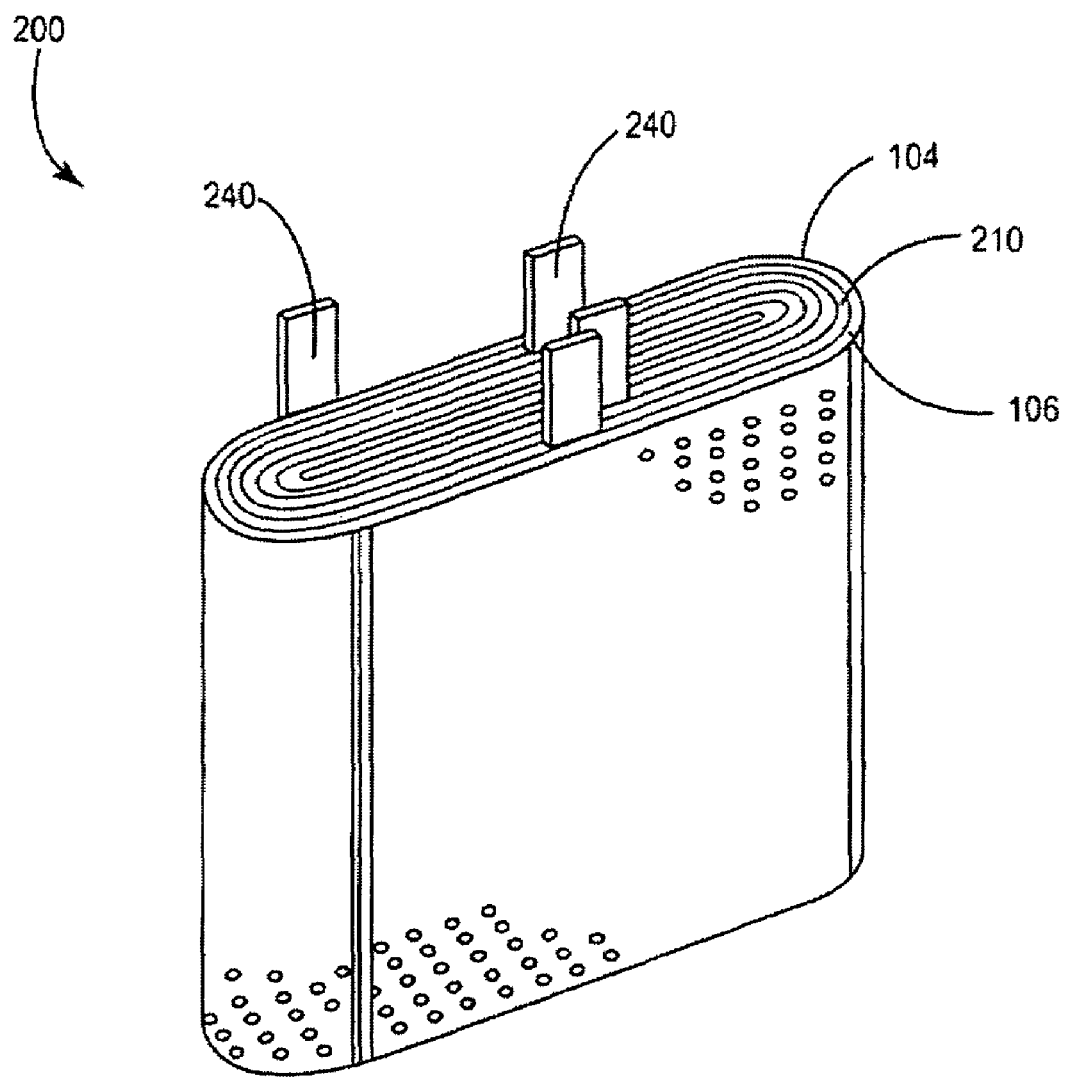
FIG. 7 shows the electrode subassembly of FIG. 5 wrapped in a flat coil configuration.

The electrode subassembly 200 can be coiled or wrapped within the capacitor cell in any suitable configuration. FIG. 6 shows the electrode subassembly 200 wrapped in a cylindrical coil configuration. Electrical connection tabs 240 are shown in FIG. 6, each extending from an anode substrate 106 and cathode 104. The coiled electrode subassembly 200 shown in FIG. 6 is not limited to the generally cylindrical coiled configuration as shown. For example, as shown in FIG. 7, the electrode subassembly 200 can be wrapped in a flat coil configuration. FIG. 7 also shows electrical connection tabs 240 extending from anode substrate 106 and cathode 104.

Figure 8:
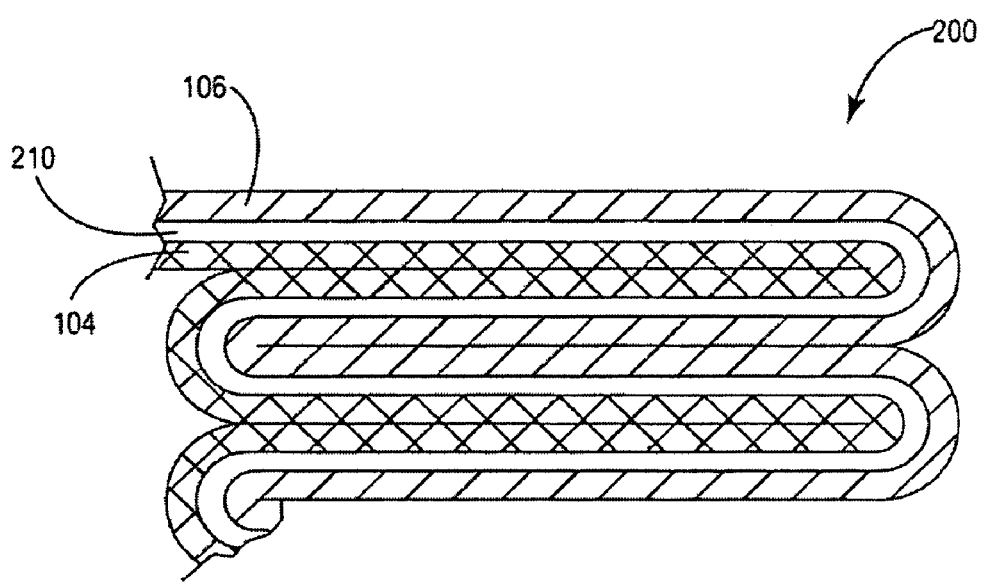
FIG. 8 shows a stacked electrode subassembly formed using an anode/separator/cathode laminate.

Other non-coiled electrode assembly configurations are available. For example, FIG. 8 shows a stacked electrode subassembly 200 formed using an anode/separator/cathode laminate. The anode/separator/cathode laminate is stacked by layering the laminate electrode subassembly 200 onto itself in a Z-fold fashion. Stacked configurations of the electrode subassembly 200 can contribute to the volume efficiency of a capacitor cell.

Figure 9:
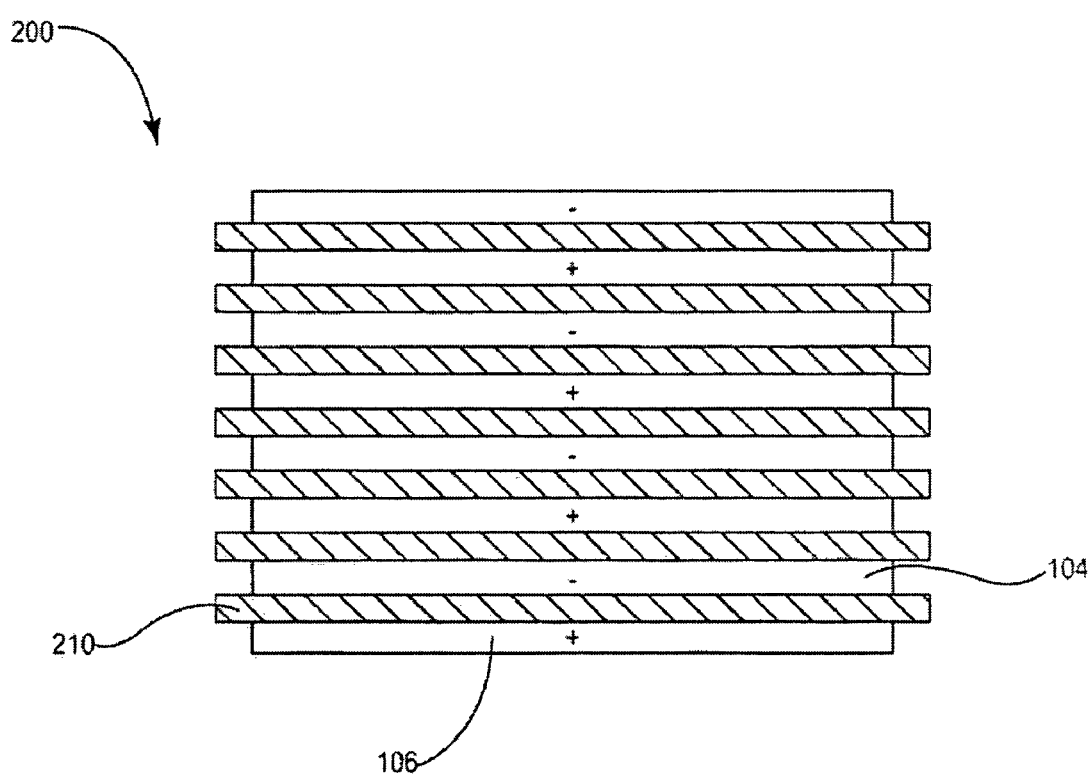
FIG. 9 shows an electrode subassembly formed using separate anode substrate, cathode, and separator layers rather than an anode/cathode/separator laminate.
Figure 10:
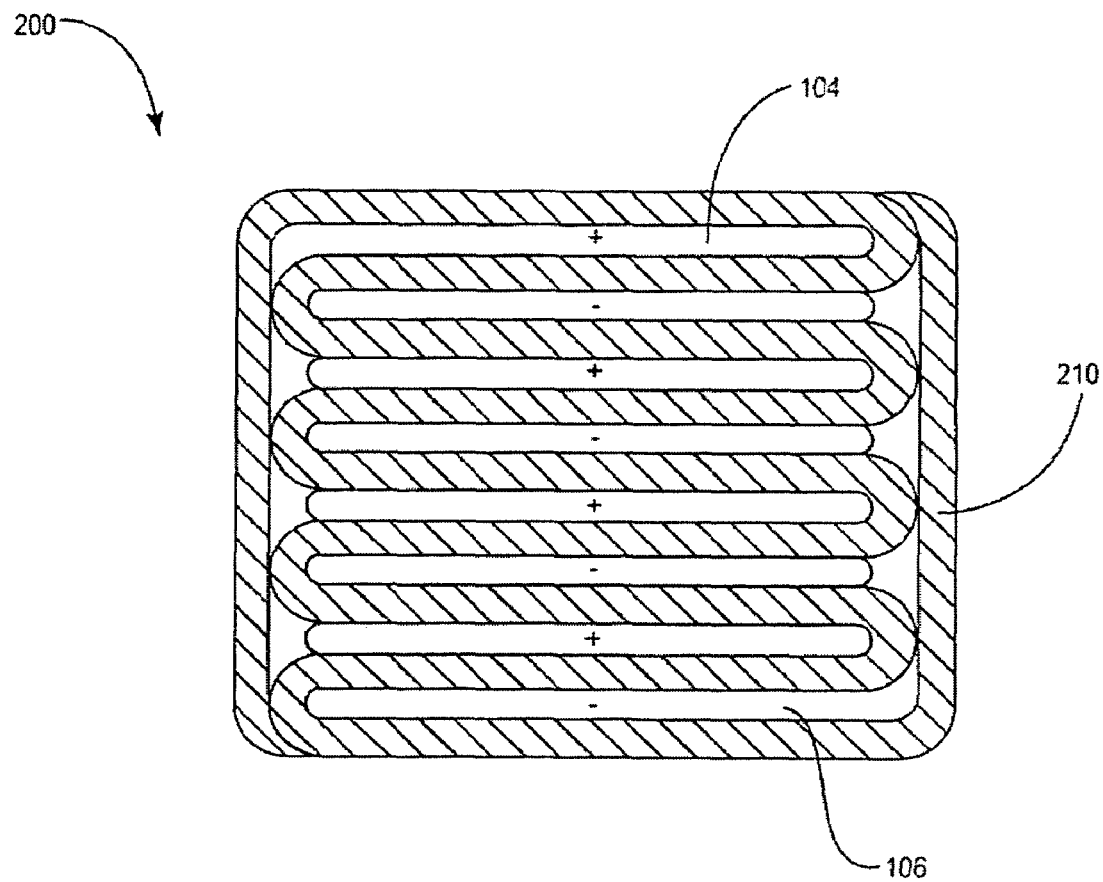
FIG. 10 shows an alternative stacked electrode subassembly wherein the separator is configured as one long strip of material that is wrapped around the electrode layers.

FIGS. 9 and 10 show an electrode subassembly 200 formed using separate anode substrate 106, cathode 104, and separator 210 layers rather than an anode/cathode/separator laminate. In these embodiments, each anode substrate layer 106 and cathode layer 104 is a substantially rectangularly-shaped segment. However, it should be apparent that the anode layers 120 and cathode layers 130 can be configured in any suitable shape. The shapes of these layers are primarily a matter of design choice, and are dictated largely by the shape, size, or configuration of the encasement within which the electrode assembly 200 is ultimately disposed.

Each anode layer 106, cathode layer 104 and separator layer 210 can be formed into a specific, predetermined shape using die cutting methods or other cutting or forming methods known in the art.

In FIG. 9, separator 210 is configured as substantially rectangularly-shaped segments that are disposed in between each anode substrate layer 106 and cathode layer 104. The separator layers 210 are typically longer than the anode layers 106 and cathode layers 104 to ensure that proper separation of the anode 106 and cathode 104 is maintained. Alternatively, as shown in FIG. 10, the separator 210 is configured as one long strip of material that is wrapped around the electrode layers. It is recognized that the long strip of separator material can be wrapped around the electrode layers in any suitable manner. In other embodiments separator 210 may be formed as one or more pouches or envelopes for surrounding individual anode substrate layers 106 and/or cathode layers 104.

In the embodiments described herein, the anode substrate 106 and cathode 104 of the capacitor cell 100 are generally shown as a single layer of material. It is recognized that in certain embodiments, one or more of the anode layers and cathode layers in a stacked or coiled electrode assembly may include multiple layers.

It should also be understood by those skilled in the art that the length of the anode/separator/cathode laminate used or that the precise number of anode and cathode layers selected for use in a given capacitor cell will depend on the energy density, volume, voltage, current, energy output and other requirements of the device. Similarly, it will be understood by those skilled in the art that the precise number connector tabs and their locations and methods for coupling electrode layers together will depend on particular requirements placed upon the capacitor cell in a given application.

Figure 11:
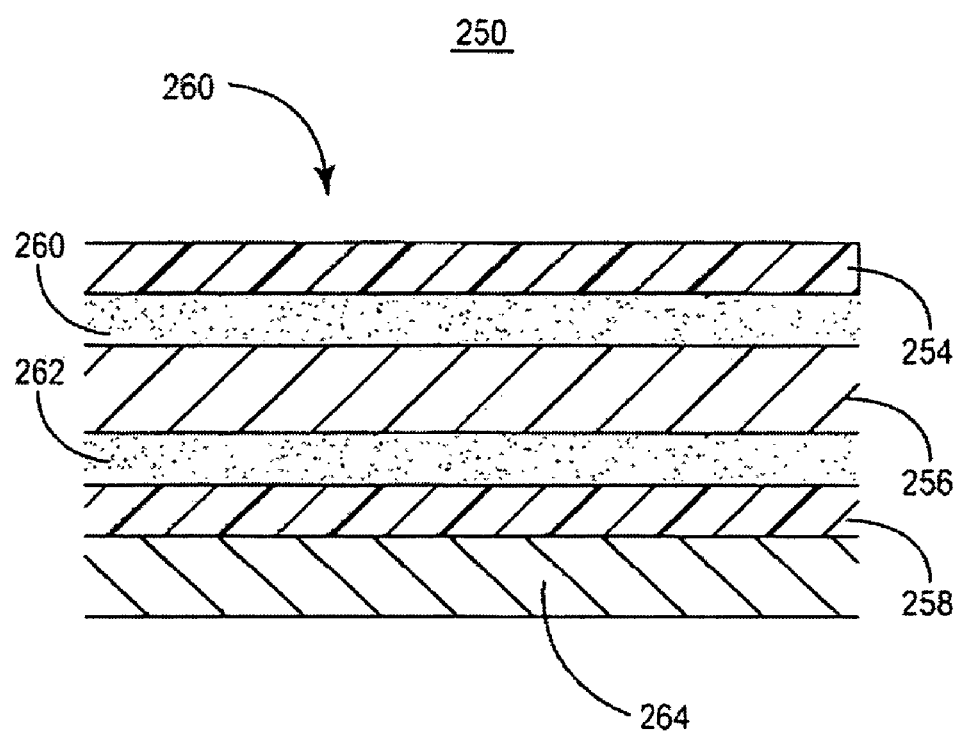
FIG. 11 is a sectional view of a portion of solid electrolytic capacitor cell.

FIG. 11 is a sectional view of a portion of solid electrolytic capacitor cell 250. A laminate structure 260 includes anode substrate 256 upon which dielectric layers 260 and 262 have been applied. Dielectric layers 260 and 262 include at least two valve metal oxides to form a mixed oxide dielectric layer. Anode substrate 256 may be in the form of a foil or sheet and may be etched or otherwise surface-area enhanced. The foil or sheet may be formed from a valve metal or valve metal alloy. Solid electrolyte layers 254 and 258 are disposed over the dielectric layers 260 and 262. A cathode layer 264 is provided, separated from the anode substrate 256 by the dielectric layer 262 and the solid electrolyte 258. The cathode layer 264 may be any suitable cathodic material, including a valve metal or valve metal alloy.

The solid electrolyte 254 and 258 is generally a thin layer and may be composed of a solid solution of a metal salt and a polymer, e.g., a solid solution of an alkali metal salt and a polymer including polytetraethylene glycol, polyacrylonitrile, polyvinyl pyrrolidine, diacrrylate, or mixtures thereof. The solid solution can be formed using a liquid solvent, such as ethylene carbonate. The solid electrolyte layers 254 and 258 could be prepared in sheets and laid onto the dielectric layers 260 and 262. Alternatively solid electrolyte layers 254 and 258 may be deposited on the dielectric layers 260 and 262 in a non-solid solution and allowed to cure as a film over the dielectric layers 260 and 262. Examples of solid electrolytes for use in a layered capacitor are generally disclosed in U.S. Pat. No. 5,646,815 issued to Owens, et al., hereby incorporated herein by reference in its entirety. Other configurations of solid state capacitors are not outside the scope of the invention such as chip type capacitors.

Thus, a capacitor cell for use in medical devices has been presented in the foregoing description with reference to specific embodiments. It is appreciated that various modifications to the referenced embodiments may be made without departing from the scope of the invention as set forth in the following claims.

The invention claimed is:

1. A capacitor cell for use in medical devices, comprising:
   an anode substrate;
   a dielectric layer, formed on the anode substrate, including at least two different valve metal oxides;
   a cathode separated from the anode substrate;
   an electrolyte operatively associated with the anode substrate and the cathode,
   wherein at least one of the at least two different valve metal oxides is an oxide of a valve metal not present in the anode substrate.

2. The capacitor cell of claim 1 wherein the anode substrate includes any of: a valve metal, a valve metal alloy, a multiphase valve metal alloy, a ceramic, and a polymer.

3. The capacitor cell of claim 1 wherein the dielectric layer includes any combination of at least two of: aluminum oxide, niobium oxide, and tantalum oxide.

4. The capacitor cell of claim 1 wherein the anode substrate includes tantalum and niobium and the dielectric layer includes tantalum oxide and niobium oxide.

5. The capacitor cell of claim 1 wherein the dielectric layer formed on the anode substrate includes a layer formed using electrochemical deposition in a formation electrolyte.

6. The capacitor cell of claim 1 wherein the anode substrate includes a foil structure.

7. The capacitor cell of claim 1 wherein the anode substrate includes a slug structure.

8. The capacitor cell of claim 1 wherein the anode substrate is a surface area enhanced substrate.

9. The capacitor cell of claim 8 wherein the surface area enhanced substrate is an etched substrate.

10. The capacitor cell of claim 1 wherein the electrolyte is a liquid electrolyte.

11. The capacitor cell of claim 1 further including a separator disposed between the dielectric layer and the cathode.

12. The capacitor cell of claim 1 wherein the anode substrate and the cathode are arranged in a stacked configuration.

13. The capacitor cell of claim 1 wherein the anode substrate and the cathode are arranged in a coiled configuration.

14. The capacitor cell of claim 1 wherein the cathode includes a valve metal alloy.

15. An implantable medical device, comprising:
   an anode substrate;
   a dielectric layer formed on the anode substrate including at least two different valve metal oxides wherein at least one of the at least two different valve metal oxides is an oxide of a valve metal not present in the anode substrate;
   a cathode separated from the anode substrate;
   an electrolyte operatively associated with the anode substrate and the cathode; and
   a capacitor cell encasement for enclosing the anode substrate, the dielectric layer formed on the substrate, the cathode and the electrolyte.

16. The device of claim 15 wherein the encasement is a shallow-drawn encasement.

17. The implantable medical device of claim 15 further including an electronics module and means for electrically connecting the anode substrate and the cathode to the electronics module.

18. The implantable medical device of claim 15 wherein the anode substrate includes any of: a valve metal, a valve metal alloy, a multi-phase valve metal alloy, a ceramic, and a polymer.

19. The implantable medical device of claim 15 wherein the anode substrate includes tantalum and niobium and the dielectric layer includes tantalum oxide and niobium oxide.

20. The implantable medical device of claim 15 wherein the dielectric layer formed on the anode substrate includes a layer formed using electrochemical deposition in a formation electrolyte.

21. The implantable medical device of claim 15 wherein the anode substrate includes a foil structure.

22. The implantable medical device of claim 15 wherein the anode substrate includes a slug structure.

23. The implantable medical device of claim 15 wherein the anode substrate is a surface area enhanced substrate.

24. The implantable medical device of claim 15 wherein the surface area enhanced substrate is an etched substrate.

25. The implantable medical device of claim 15 wherein the electrolyte is a liquid electrolyte.

26. The implantable medical device of claim 15 further including a separator disposed between the dielectric layer and the cathode.

27. The implantable medical device of claim 15 wherein the anode substrate and the cathode are arranged in a stacked configuration.

28. The implantable medical device of claim 15 wherein the anode substrate and the cathode are arranged in a coiled configuration.

29. The implantable medical device of claim 15 wherein the cathode includes a valve metal alloy.

* * * * *